Jan. 2, 1923.
W. B. STONE.
HARVESTER.
FILED OCT. 14, 1920.
1,440,642
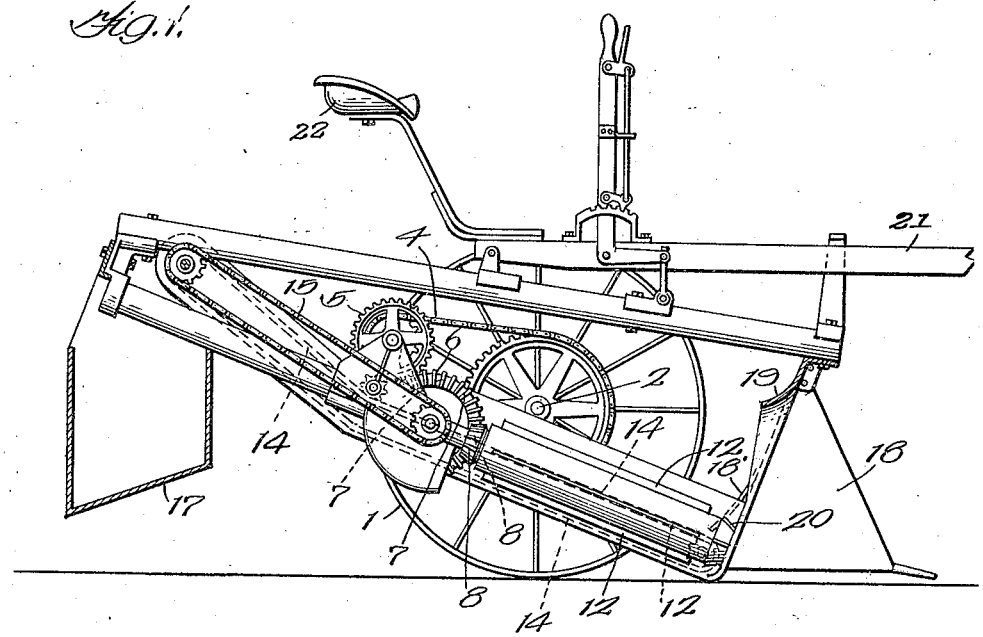
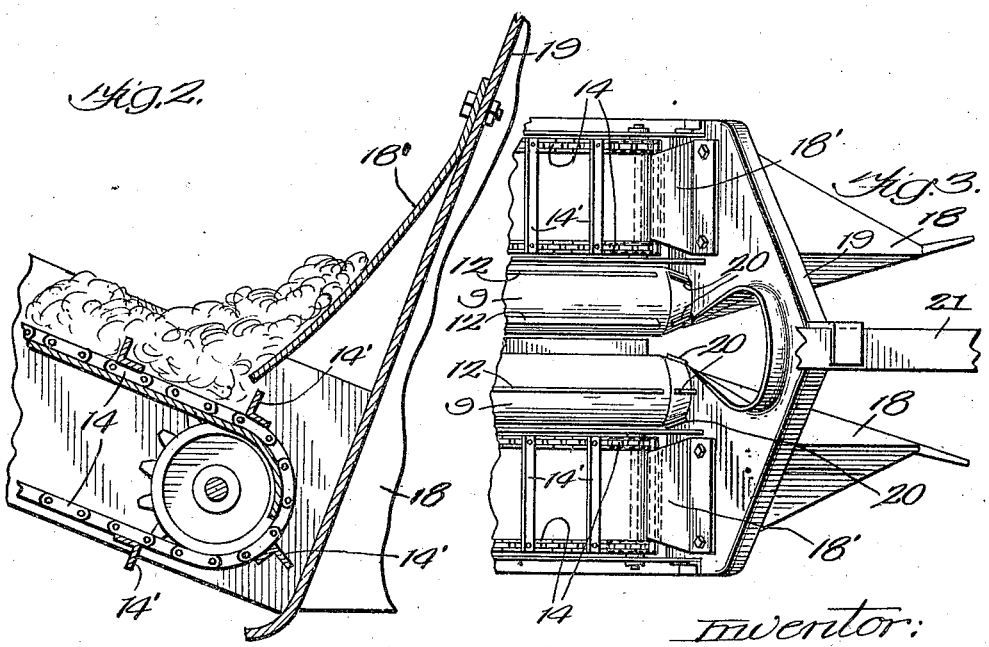
Inventor:
Waldo B. Stone Patented Jan. 2, 1923.

1,440,642

UNITED STATES PATENT OFFICE.

WALDO B. STONE, OF OAK PARK, ILLINOIS.

HARVESTER.

Application filed October 14, 1920. Serial No. 416,973.

*To all whom it may concern:*

Be it known that I, WALDO B. STONE, citizen of the United States, residing at Oak Park, in the county of Cook and State of Illinois, have invented a certain new and useful Improvement in Harvesters, of which the following is a full, clear, concise, and exact description.

My invention relates to harvesters which are employed for the purpose of harvesting corn in the ear and removing cotton bolls. My invention is of particular service in connection with a machine of this class that employs a gathering element in the form of a rotating body which is ribbed longitudinally of its axis of rotation, there being another body between which and the said rotating body plants or stalks may be confined as the machine is traveling through the field. This other body is also a rotating body similar to the first mentioned rotating body and similarly provided with ribs. These ribs serve to engage the ears of corn, the cotton bolls, or other plant product which is to be removed, and transfer the removed product to suitable conveying mechanism located alongside and longitudinally of the rollers. The conveying mechanism, which is of any suitable form, is located close beside the rolls, the ribs being preferably withdrawn to their farthest extent within the rollers when opposite the conveyers in order that the product removed by the ribs may readily drop upon the conveyers from the rollers without liability of falling between the conveyers and the rollers. The ribs upon each cylinder, as the cylinders are rotated, interleave or intermesh with the ribs upon the companion cylinder so that the plant product that is being removed is forced to come into contact with the gathering ribs, whereby the removal of the maximum quantity of plant product is assured.

The machine above generally described to which my invention is well adapted is disclosed in United States Patent 1,069,997, dated August 12, 1913 and granted to John F. Appleby. In operating a machine of this class in the fields I have discovered that the plant products gathered by the ribs upon the rollers and thrown thereby upon the conveyers are apt to accumulate at the lower ends of the conveyers beyond the capacity of the conveyers to remove them fully. This is especially liable to happen when the bolls are in a dry state, the receiving capacity of the conveyer belts being least at their lower ends where they turn. I overcome the difficulty by employing chute elements, such as plates or aprons, which overlie the conveyer belts where they turn, and which serve to direct the product falling toward the lower ends of the belt upon flat portions of the upwardly moving top conveying stretches of the belt.

I will explain my invention more fully by reference to the accompanying drawing showing enough of the machine of the aforesaid patent to enable the illustration of the adaptation of my invention thereto. In the drawing Fig. 1 is a sectional elevation of such a machine; Fig. 2 is a view on a larger scale of a portion of the front and lower portion of the machine illustrated in Fig. 1; and Fig. 3 is a plan view of a portion of the machine at its front end.

Like parts are indicated by similar characters of reference throughout the different figures.

The machine desirably includes but two traction wheels 1 that are free to rotate upon the main shaft 2 in so far as such rotation will be permitted by well known clutching devices which need not be illustrated. Sprocket chains 4 4 are driven by the traction wheels when the harvester is moving forward either in a curved or straight line and are not driven when the rotation of the traction wheels is reversed, as set forth in the aforesaid patent. These sprocket chains are in suitable driving relation with a spur gear 5 by instrumentalities which are illustrated in a general way and which are so well understood by those skilled in the art as to require no detailed description or illustration. The spur gear drives another spur gear 6 that is in mesh therewith, and the spur gear 6 in turn drives bevel gears 7 that are preferably integrally formed therewith. The bevel gears 7 are in mesh with bevel pinions 8 fixed with respect to the cylindrical rollers 9, all as set forth in said patent.

Four longitudinal ribs 12, spaced 90° apart and preferably arranged as set forth in said patent, extend from the rollers or cylinders 9. The ribs of each roller are in interleaving or intermeshing relation with the ribs of the other roller, as set forth in said patent, whereby the ribs of one roller are brought into opposition with the cylindrical portions of the other rollers when occupying insetting horizontal positions. Where the rollers are close enough together, the ribs desirably project more than half way across the space intervening between the rollers so as to insure the contact of all the plant products that are to be removed by the ribs. It will be observed that the cylindrical portion of each roller acts as a resisting surface for the ribs of the companion roller, whereby the plant products are sufficiently confined between the rib that is acting to strip the plant product from the plant and the co-acting resisting surface. The rollers are caused to rotate in opposite directions with the upper portions of the rollers moving away from each other. The machine organized as illustrated is thus caused to pull the plant products from the plant, each rib acting in direct cooperation with the cylindrical portion of the roller presented to it, rather than in direct co-operation with a rib upon the companion roller, whereby the plant products are not pinched, but I do not wish to be limited to this relative arrangement of the ribs. The conveyers 14 may be of any suitable formation, the common form of endless belt conveyers being illustrated in the drawing, these belt conveyers being driven by a sprocket chain 15. The plant products discharged upon the belt conveyors are conveyed upwardly and are discharged from the belt conveyers into a suitable receptacle 17. These belt conveyers are parallel with the rollers, the upper stretches thereof desirably lying in substantially the same plane that includes the axes of the rollers. By inclining the rollers downwardly, plant products at different heights upon the plants are brought into contact with the gathering ribs 12. The machine is provided with two directing fenders 18 at its forward end, whereby the plants are gathered laterally and are guided thereby into the space between the rollers. These gathering fenders are provided with a yoke 19 at their rear, through the opening in which the plants are passed, the top of the yoke pressing the taller plants into proper positions to be operated upon by the rollers. The shaft 2 of the machine is located in front of the gearing and serves further to depress the plants to insure the engagement of their products by the gathering ribs and to prevent the plants from becoming entangled in the roller operating gearing located to the rear of said shaft. Supplemental ribs 20 upon the bottoms of the rollers and in the same planes with the ribs 12 serve to gather the plant portions that are upon the ground, these supplemental ribs desirably sloping forwardly toward the axes of the rollers so that they may lie parallel with the ground when in their lowermost positions.

Hitherto plant products were apt to accumulate above the lower bights of the conveyers and become clogged at this point, the cross cleats 14' upon the conveyers having less carrying capacity upon these bights. I shield the spaces between cleats upon the lower bights to the conveyers by means of the chute elements 18' that overlie the lower bights of the conveyers and which are in position to receive plant portions cast from the rollers. These chute elements serve to prevent or to reduce the lodgment of the gathered product upon the lower bight portions of the conveyers and to direct such product upon the straight portions of the upper stretches of the belts. These chute elements are preferably in the nature of aprons which are in substantially fixed position, being desirably bolted upon the fenders 18. The invention, however, is not to be limited to any particular form of chute structure to accomplish the object of my invention. The machine may be equipped with a draft tongue 21 so as to permit it to be drawn by a pair of horses, a seat 22 being disposed upon the vehicle for the driver.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. A harvesting machine including an inclined plant product gathering roller; an endless conveyer arranged along side of said roller to be in a position to receive plant product from the roller; and a chute element overlying the lower bight of the conveyer and also in position to receive plant product from the roller and serving to direct such plant product away from the lower bight of the conveyer and upon the adjacent flat portion of the top stretch of the conveyer.

2. A harvesting machine including two inclined plant product gathering rollers provided with ribs extending along the same, these rollers being arranged to permit the plants to pass therebetween to permit the ribs to engage the plant products and remove the same from the plants; mechanism for causing the rollers to rotate in opposite directions with the upper portions of the rollers moving away from each other, said ribs intermeshing or interleaving as the rollers rotate, the body portion of each roller being close to the nearest rib upon the other roller whereby the said body portion affords a resisting portion against which the rib that is in the act of removing plant products may press the plants; endless conveyers located in close proximity to the rollers; and chute elements overlying the lower bights of the conveyers and also in position to receive plant products from the rollers and serving to direct such plant products away from the lower bights of the conveyers and upon the adjacent flat portions of the top stretches of the conveyers.

3. A harvesting machine including a plant product gathering roller; an endless conveyer arranged along side of said roller to be in a position to receive plant product from the roller; and a chute element overlying the lower bight of the conveyer and also in position to receive plant product from the roller and serving to direct such plant product away from the lower bight of the conveyer and upon the adjacent flat portion of the top stretch of the conveyer.

4. A harvesting machine including two plant product gathering rollers provided with ribs extending along the same, these rollers being arranged to permit the plants to pass therebetween to permit the ribs to engage the plant products and remove the same from the plants; mechanism for causing the rollers to rotate in opposite directions with the upper portions of the rollers moving away from each other, said ribs intermeshing or interviewing as the rollers rotate, the body portion of each roller being close to the nearest rib upon the other roller whereby the said body portion affords a resisting portion against which the rib that is in the act of removing plant products may press the plants; endless conveyers located in close proximity to the rollers; and chute elements overlying the lower bights of the conveyers and also in position to receive plant products from the rollers and serving to direct such plant products away from the lower bights of the conveyers and upon the adjacent flat portions of the top stretches of the conveyers.

In witness whereof, I hereunto subscribe my name this 12th day of October, A. D. 1920.

WALDO B. STONE.